United States Patent [19]
Cho et al.

[11] Patent Number: 5,491,977
[45] Date of Patent: Feb. 20, 1996

[54] ENGINE USING COMPRESSED AIR

[75] Inventors: Cheol-seung Cho, 147, Noryangjin-dong, Dongjak-Ku, Seoul; Kwang-soo Han, Kangwon, both of Rep. of Korea

[73] Assignee: heol-seung Cho, Seoul, Rep. of Korea

[21] Appl. No.: 331,596

[22] PCT Filed: Mar. 4, 1994

[86] PCT No.: PCT/KR94/00017

§ 371 Date: Nov. 3, 1994

§ 102(e) Date: Nov. 3, 1994

[87] PCT Pub. No.: WO94/20733

PCT Pub. Date: Sep. 15, 1994

[30] Foreign Application Priority Data

Mar. 4, 1993 [KR] Rep. of Korea .................. 1993-3233

[51] Int. Cl.[6] .................................................. F16D 31/02
[52] U.S. Cl. ........................................................ 60/370
[58] Field of Search ...................... 60/325, 370; 92/261; 123/197.1, 197.2, 197.3, 19.4, 58.1

[56] References Cited

U.S. PATENT DOCUMENTS

| 1,496,490 | 6/1924 | Powell | 123/197.1 X |
|---|---|---|---|
| 1,569,582 | 1/1926 | Scott | 123/197.1 X |
| 1,667,213 | 4/1928 | Marchetti | 123/58.1 X |
| 2,383,213 | 8/1945 | Porter | 60/370 |
| 3,765,180 | 10/1973 | Brown | |
| 3,885,387 | 5/1975 | Simington | |
| 4,102,130 | 7/1978 | Stricklin | 60/370 X |
| 4,111,164 | 9/1978 | Wuerfel | 123/197.3 X |

FOREIGN PATENT DOCUMENTS

| 2449805 | 9/1980 | France . |
|---|---|---|
| 2338884 | 3/1974 | Germany . |
| 2422672 | 11/1975 | Germany . |

Primary Examiner—Edward K. Look
Assistant Examiner—Hoang Nguyen
Attorney, Agent, or Firm—Christie, Parker & Hale

[57] ABSTRACT

An engine (32) driven by compressed air, including an electric motor (36) driven by a battery (B), a compressor for generating the compressed air by use of a drive power of the electric motor (36), an intake manifold (40) connected with an outlet of the compressor with the intake manifold (40), a crank shaft having four separate crank pins being connected to a piston in the cylinder by a connecting rod, and a cam shaft connected with the crank shaft by a belt or chain.

3 Claims, 8 Drawing Sheets

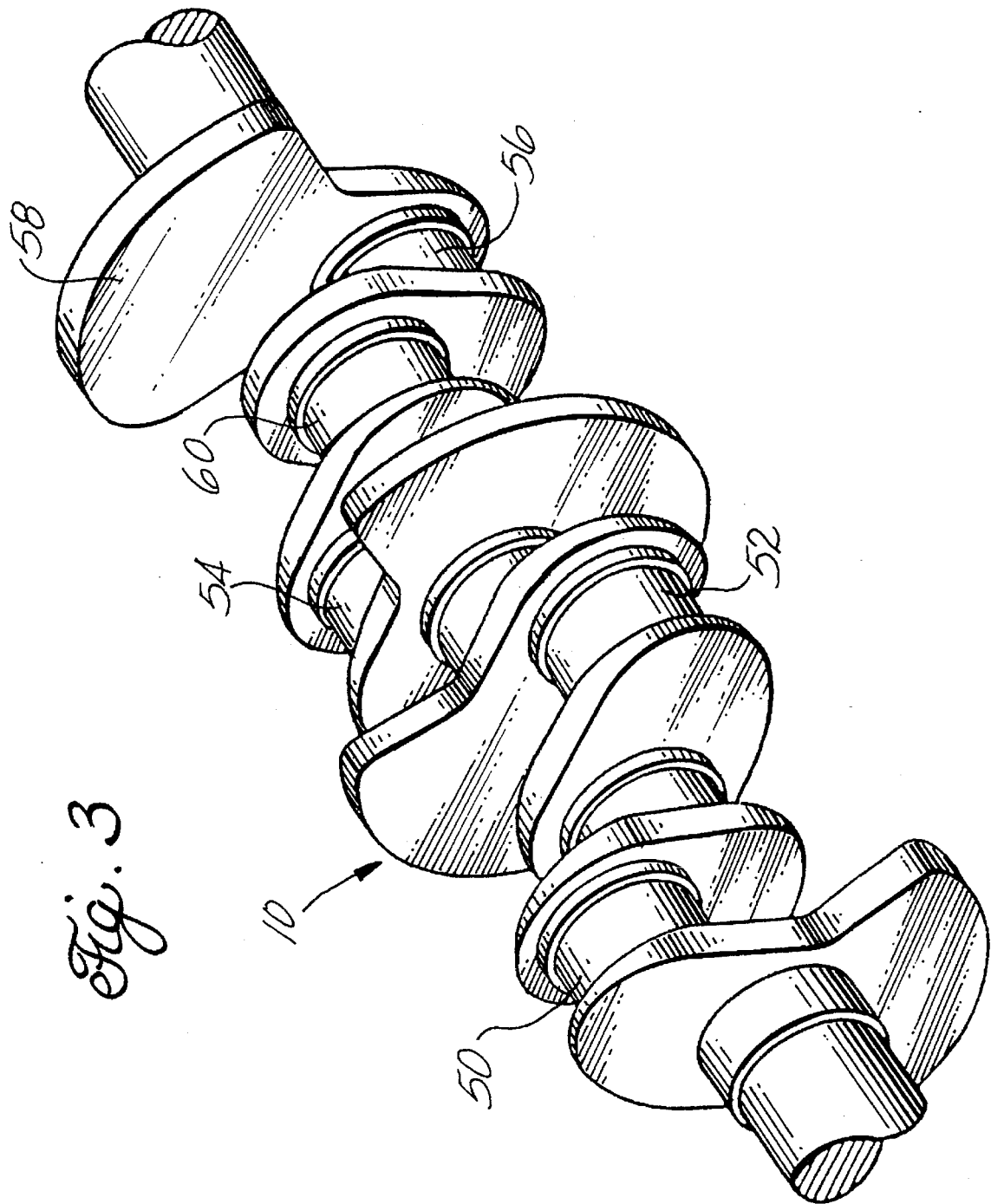

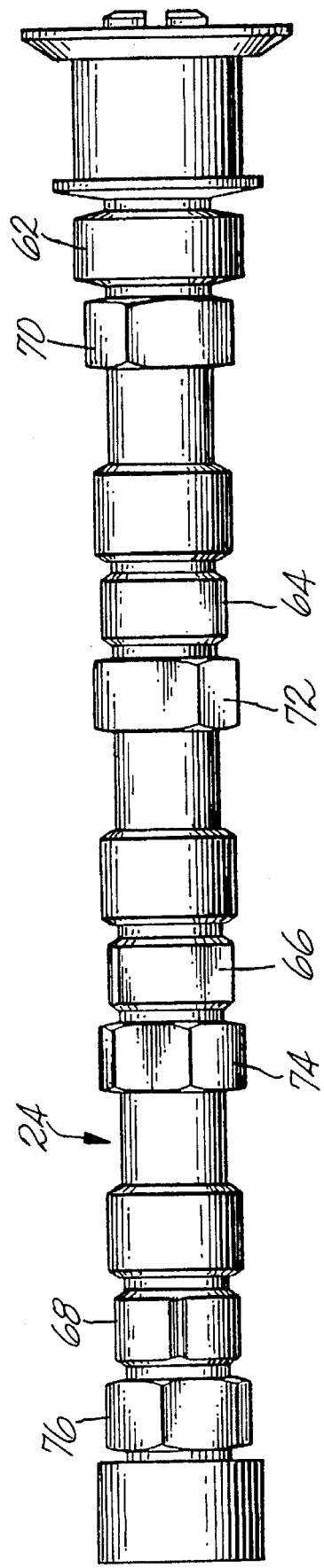

Fig. 7

| ROTATING ANGLE / CYLINDER | 0°–90° | 90°–180° | 180°–270° | 270°–360° | 360°–450° | 450°–540° | 540°–630° | 630°–720° |
|---|---|---|---|---|---|---|---|---|
| 1 | INTAKE | INTAKE | EXHAUST | EXHAUST | INTAKE | INTAKE | EXHAUST | EXHAUST |
| 3 | | INTAKE | INTAKE | EXHAUST | EXHAUST | INTAKE | INTAKE | |
| 4 | EXHAUST | INTAKE | INTAKE | EXHAUST | EXHAUST | INTAKE | | |
| 2 | EXHAUST | EXHAUST | INTAKE | INTAKE | EXHAUST | EXHAUST | INTAKE | INTAKE |

Fig. 8

| ROTATING ANGLE / CYLINDER | | 0°–45° | 45°–90° | 90°–135° | 135°–180° | 180°–225° | 225°–270° | 270°–315° | 315°–360° |
|---|---|---|---|---|---|---|---|---|---|
| 1 | INTAKE | OPEN | CLOSE | CLOSE | OPEN | OPEN | CLOSE | CLOSE | OPEN |
| 1 | EXHAUST | CLOSE | OPEN | OPEN | CLOSE | CLOSE | OPEN | OPEN | CLOSE |
| 3 | INTAKE | CLOSE | OPEN | OPEN | CLOSE | CLOSE | OPEN | OPEN | CLOSE |
| 3 | EXHAUST | OPEN | CLOSE | CLOSE | OPEN | OPEN | CLOSE | CLOSE | OPEN |
| 4 | INTAKE | CLOSE | CLOSE | OPEN | OPEN | CLOSE | CLOSE | OPEN | OPEN |
| 4 | EXHAUST | OPEN | OPEN | CLOSE | CLOSE | OPEN | OPEN | CLOSE | CLOSE |
| 2 | INTAKE | OPEN | OPEN | CLOSE | CLOSE | OPEN | OPEN | CLOSE | CLOSE |
| 2 | EXHAUST | CLOSE | CLOSE | OPEN | OPEN | CLOSE | CLOSE | OPEN | OPEN |

5,491,977

ENGINE USING COMPRESSED AIR

BACKGROUND OF THE INVENTION (1) Field of the Invention

This invention relates to an engine using compressed air as a power instead of fuel such as gasoline or diesel and, more particularly, to an engine which is driven by ascending and descending operations of pistons by compressed air induced into cylinders of the engine body.

(2) Background of the Prior Art

Generally, power needed for an engine used in a vehicle and in industrial machinery is obtained by burning gasoline or diesel, which causes an air pollution, emission problem.

Thus a vehicle driven by electric power is now being developed, but until now it has been difficult to be widely used because of many problems, especially low power or weight.

In a four-cycle internal combustion engine a cycle including an intake-stroke, a compression-stroke, an explosion-stroke and a exhaustion-stroke is accomplished while a crank shaft is rotated twice.

The explosion stroke occurs just once during twice rotation of the crank shaft, which causes substantial power loss during the other strokes. Thus a fly-wheel is needed for a constant rotation speed of the crank shaft.

Seen from another aspect, the internal combustion engine needs fuel. In order to improve fuel consumption ratio an engine using lean mixer is developed only to save a little fuel.

Further in order to reduce exhaust gas, many attempts including exhaust gas recirculation system have been done but these attempts require additional installations and need much time to accomplish a satisfactory purpose.

SUMMARY OF THE INVENTION

It is an object of the invention to provide an engine which is not driven by burning fuel such as gasoline and diesel.

It is another object of the invention to provide an engine which is more compact than a conventional internal combustion engine.

To accomplish the above objects, the present invention provides an engine driven by a compressed air, including a electric motor driven by a battery, means for generating the compressed air by use of a driving power of the electric motor, an intake manifold connected with an outlet of the means, a cylinder block including a plurality of cylinders communicating with the intake manifold, a crank shaft connected to a piston of the cylinder by a connecting rod, and a cam shaft connected with the crank shaft by means of the belt or chain.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 3 is a perspective view of a crank shaft according to the invention.

FIG. 4 is a front view of a cam shaft according to the invention.

FIG. 7 is a table illustrating the relation of angles of the crank pin and strokes of the cylinders according to the invention.

FIG. 8 is a table illustrating the valve timing of the engine according to the invention.

DETAILED DESCRIPTION OF A PREFERRED EMBODIMENT

Figure 1:
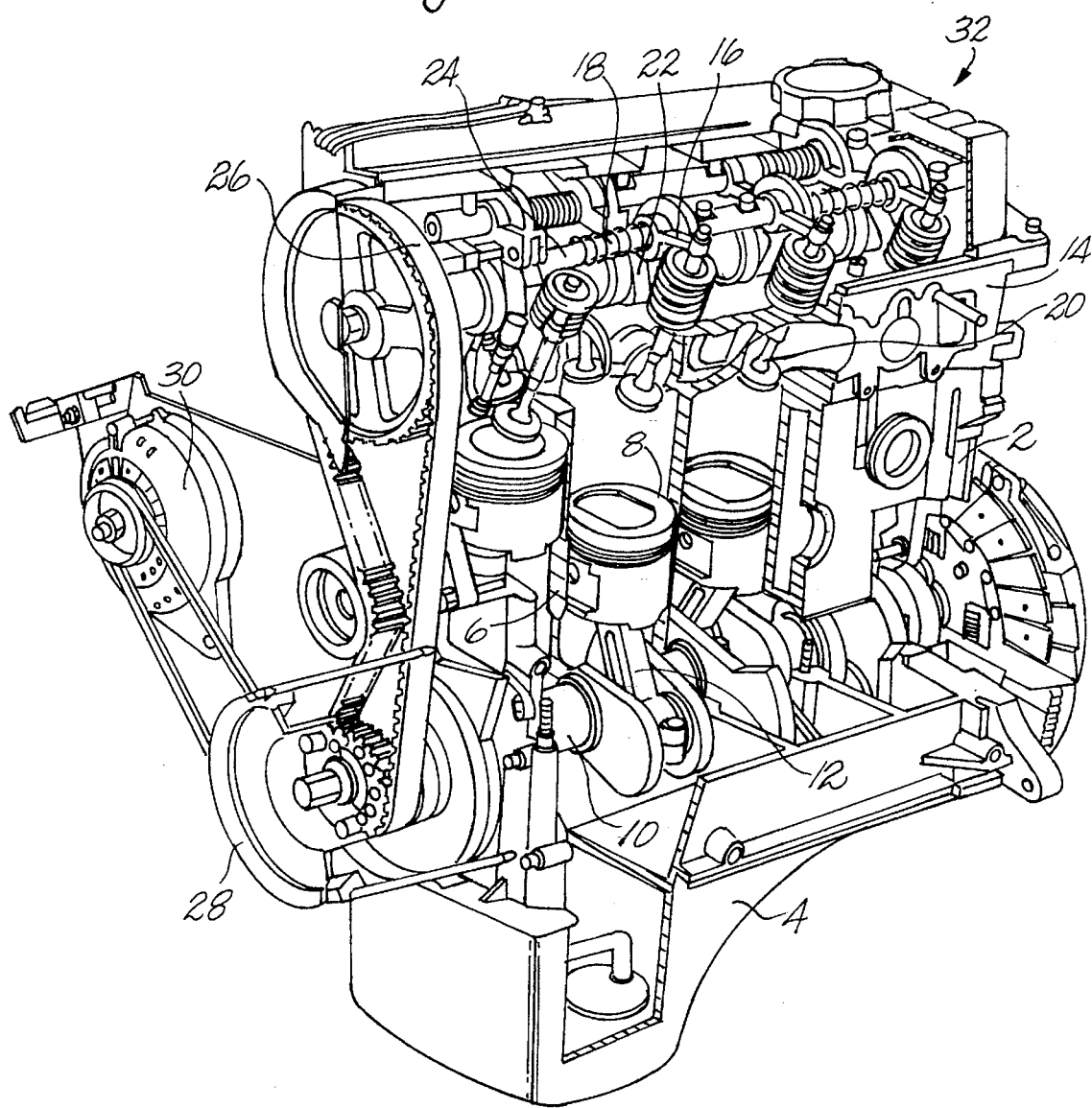
FIG. 1 is a partially cutaway view in perspective showing an engine body according to a preferred embodiment of the invention.

Referring now to the drawings with greater particularity, FIG. 1 is a cutaway view in perspective showing an engine according to the invention, in which the engine comprises a cylinder block 2. the cylinder block 2 is moulded in the form of block structure in a body with cylinders more than 4. An oil pan 4 for containing oil for lubricating parts of the engine is connected to lower portion of the cylinder block 2. Each cylinder 6 disposed inside of the cylinder block 2 has a piston 8 which moves in a straight line.

Each piston 8 is connected to a connecting rod 12 and the straight-line motion of the piston 8 is converted to rotation of a crank shaft 10. A cylinder head 14 having a rocker arm shaft 18 having a number of rocker arms 16 is connected to upper portion of cylinder 6.

The rocker arms 16, contact upper portions of stems of intake and exhaust valves 20 which are opened and closed thereby. (intake valve is not shown)

The crank shaft 10 is driven by a timing belt 26 and a cam shaft 24 having cams 22 for intake and exhaust valve, each of the shafts 10 and 24 has a timing gear with a certain number of teeth respectively, which ensures the rotation ratio, two rotations of the crank shaft 10 per one rotation of the cam shaft 24.

The crank shaft 10 drives a pulley 28 rotatable with the timing gear at its one end, which drives a generator 30 through a belt, that is, rotation of the crank shaft 10 can generate an electricity.

Figure 2:
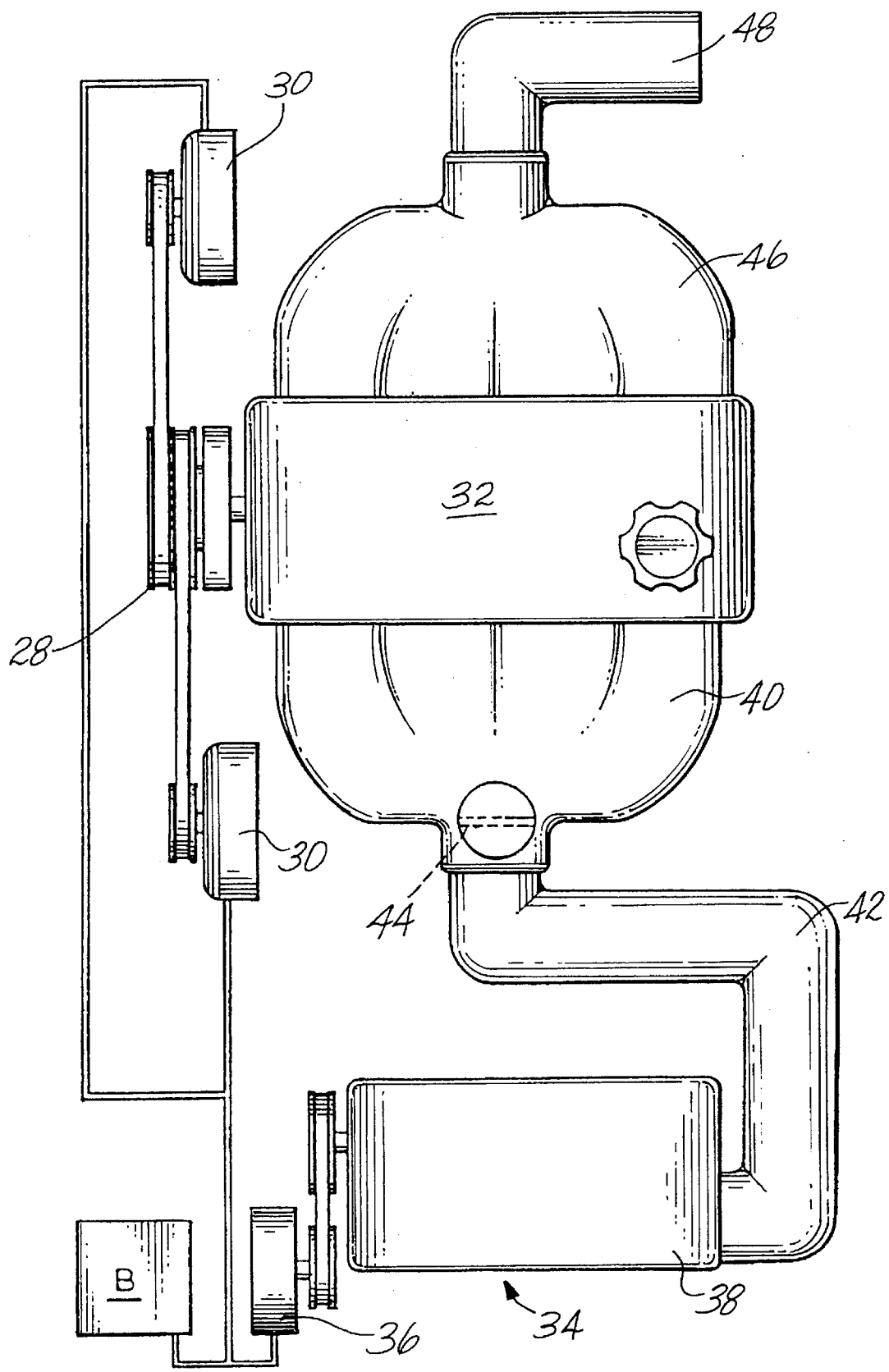
FIG. 2 is a schematic view of the invention.

FIG. 2 is a schematic view showing a preferred embodiment of the invention.

The number of generator 30 can be at least one as shown in FIG. 1 or as shown in FIG. 2, where the generator 30 charges a battery B, which should be changed when it becomes discharged.

In order to charge the battery B, parallel or serial hybrid systems can be used, which is a general and known method of charging for a electro mobile, so detailed description of the method is omitted in this specification.

That is, the turning effect of the crank shaft 10 of a body 32 is transferred to the generator 30, which generates electricity for a member 34 for generating compressed air.

The generating member 34 for compressed air comprises an electro motor 36 driven by the battery B; and a compressor 38 receiving the driving force of the electro motor 36 through a belt and generating the compressed air by rotating a driving plate (not shown). The number of the compressor 38 can be, if necessary, two in serial type.

The compressor 38 is connected with a passage 42 connected with an intake manifold 40 which permits the compressed air to be induced to the cylinders 6. The passage 42 has a throttle valve 44 for regulating the amount of the compressed air and the valve 44 is interconnected to an accelerator of the vehicle (not shown).

FIG. 3 is a perspective view of a crank shaft for the engine shown in FIG. 1, which shows the possibility of application to a 4-cylinder engine. Each one of the crank pins 50, 52, 54 and 56 is disposed with 90 degrees with respect to the other crank pin 52, 54, 56 and 50.

The crank shaft can be designed such that a balance weight 58 and a journal can be identical or similar with that of the conventional art.

FIG. 4 is a front view of the cam shaft according to a preferred embodiment of the present invention, in which cams for intake valves ("intake cams") 62, 64, 66, and 68 and cams for exhaust valves ("exhaust cams") 70, 72, 74 and 76, which are respectively paired with each other, are arranged on the cam shaft.

Figure 6A:
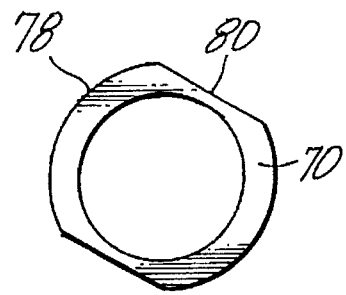
FIGS. 6A through 6D are views showing relation of positions of an exhaust cam and cylinders according to the invention.
Figure 6B:
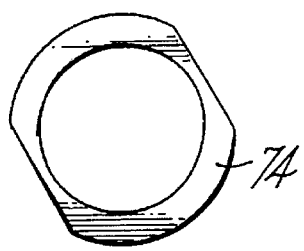
Figure 6C:
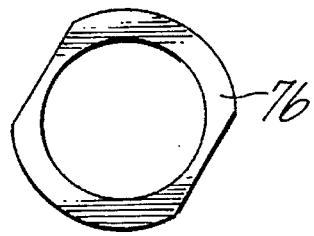
Figure 6D:
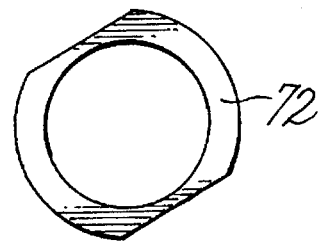

Each intake cam 62, 64, 66 and 68 includes two lobes which are formed in symmetry with each other as shown in FIGS. 6A through 6B.

Accordingly, the intake cams are arranged such that their lobes are offset by angle of 45 degrees with respect to each other.

That is, as shown in FIGS. 5A through 5D, if the intake cam 62 which relates to a first cylinder is arranged such that its lobes are vertically located in the drawing, the intake cam 66 which relates to a third cylinder is arranged such that its lobes are offset by angle of 45 degrees with respect to the lobes of the intake cam 62. And the intake cam 68 which relates to a fourth cylinder is arranged such that its lobes are offset by angle of 45 degrees with respect to the lobes of the intake cam 66 and the intake cam 64 relating to a second cylinder is arranged such that its lobes are offset by angle of 45 degrees with respect to the lobes of the intake cam 68.

Further, each, exhaust cam 70, 72, 74 and 76 includes portions 78 for opening exhaust valve and portions 80 for closing exhaust valve. The exhaust valve opening portions 78 are formed in the shape of arc surfaces which maintain an identical distance from a center of exhaust cam. The exhaust valve closing portions 80 are formed in the shape of flat surfaces which respectively interconnects the both side ends of the arc shape surfaces of the exhaust valve opening portions 78.

Such exhaust cams 70, 72, 74 and 76 are also respectively arranged with an offset by 45 degrees with respect to each other in the same manner as that of the intake cams 62, 64, 66 and 68 according to a relationship in order of the first, third, fourth, and second cylinders.

The engine according to the present invention as described above uses a battery B as a source of electricity for driving the electric motor 36. the compressor 38 is operated by the driving power of the electric motor 36, thereby generating the compressed air.

At this point, when the compressed air generated from the compressor 38 is sufficiently compressed, the compressed air is flowed into the cylinder through the intake manifold 40 by opening the throttle valve 44.

In case of 4-cylinder engine, when one of four pistons is located in a top dead center, another of the pistons is located in a bottom dead center and the others of the pistons are located between the top and bottom dead centers, whereby the compressed air can be induced into the cylinder in which the piston is located on the top dead center.

For the convenience of description, supposing that the piston of the first cylinder is located in the top dead center, in case of the 4-cylinder engine, explosion occurs in the order of first, third, fourth, and second cylinders. Accordingly, the compressed air is flowed into the first cylinder.

At this point, the crank pin 50 is disposed twelve o'clock direction as shown in FIG. 3, the intake cam 62 of the cam shaft 24 pushes the rocker arm to open the intake valve. Each crank pins 52, 54 and 65 are disposed with angle of ±90 degrees with respect to the crank pin 50.

FIG. 7 is a table illustrating a operating state when each crank pin 50, 52, 54 and 56 of the crank shaft 10 is disposed in above-described position. When the intake operation is initiated simultaneously with the piston connected with the crank pin 50 which relates to the first cylinder descends, the piston connected with the crank pin 54 which relates to the third cylinder is to be in the end of the exhaust stroke, the piston connected with the crank pin 56 which relates to the third cylinder is to be in the middle of the exhaust stroke, and the piston connected with the crank pin 52 which relates to the second cylinder is to be in the beginning of the exhaust stroke.

At this point, when the crank shaft 10 rotates by angle of 180 degrees, the piston relating to the first cylinder completely descends to the bottom dead center, completing the intake stroke, and in turn, when the crank shaft 10 rotates again by angle of 180 degrees, the piston ascends again to realize the exhaust stroke.

This operation repeatedly occurs at all cylinders such that, when the crank shaft 10 rotates by an angle of 720 degrees, each intake and exhaust valve is opened and closed twice while the cam shaft 24 rotates by angle of 360 degrees.

As a result, one expansion per one rotation of the crank-shaft can be obtained. This is accomplished by the cam shaft which will be described below.

Figure 5A:
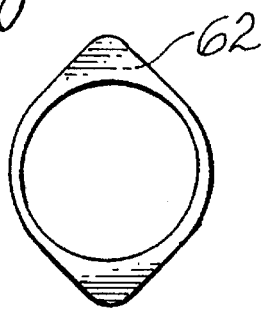
FIGS. 5A through 5D are views showing relation of positions of an intake cam and cylinders according to the invention.

The intake cam 62 relating to the intake valve of the first cylinder is disposed as shown in FIG. 5A in the intake stroke.

Figure 5B:
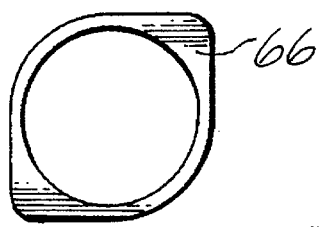
Figure 5C:
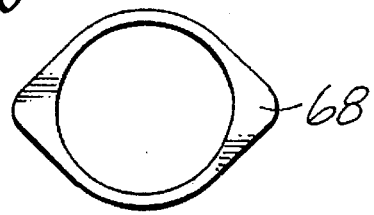
Figure 5D:
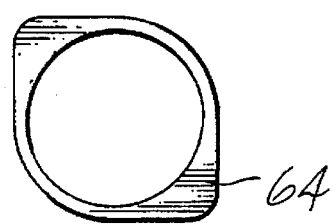

Further, the intake cams 66, 68, 64 which respectively relate to the third, fourth, second cylinders are disposed as shown in FIGS. 5B, 5C, and 5D, respectively.

FIG. 8 is a table illustrating the operation of the intake cams 62, 64, 66, 68, 70, 72, 74 and 76, in which since the intake cam 62 is disposed as shown in FIG. 5A, the intake valve is to be in an opening state, such that in a state that an extremity of the lobe is in a state of contacting the rocker arm, when the cam shaft 24 rotates by angle of 22.5 degrees, the intake stroke is completed and, at the same time the compressed air is completely induced.

At this point, the crank shaft 10 is rotated by descending of the piston by the compressed air such that twice ascending and descending operations of the piston per rotation of the cam shaft is accomplished.

That is, since the intake valve is opened in a range of angle of 45 degrees of the intake cam of the cam shaft 24 and closed in angle of 135, twice open and close operations per one rotation of the cam shaft 24 is realized.

Thus, the closing operations of the exhaust cams 70, 72, 74 and 76 occurs while the cam shaft rotates by angle of about 12.5 degrees after the intake cams 62, 64, 66 and 68 is opened in order.

Accordingly, the piston in the cylinder 6 descends while the compressed air is induced. The compressed air is exhausted to the atmosphere while the piston ascends and, at this point, with the same manner, the intake and exhaust operations are accomplished in other cylinders, whereby accomplishing the one expansion drive power per one rotation of the crank shaft 10.

Accordingly, the engine according to the present invention can obtain one expansion drive power per one rotation of the crank shaft, while the conventional engine obtains one expansion drive power per two rotation of the crank shaft. As a result, the engine of the present invention having a 4-cylinder engine operates as conventional 8-cylinder engine.

Accordingly, since the engine of the present invention is not to be excessively heated, a system for cooling the engine is not necessary. The filtering means for filtering the air pollution is not also necessary. As a result, when the engine of the present invention is equipped in a vehicle, the overall structure of the vehicle is to be more compact.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

We claim:

1. An engine driven by a compressed air, comprising:

means for generating compressed air an intake manifold connected with an outlet of said means;

a cylinder block including a plurality of cylinders communicating with the intake manifold;

a crank shaft connected to a piston in the cylinder via a connecting rod, wherein the crank shaft have first, second, third, and fourth crank pins each of which is connected to the corresponding connecting rod, and wherein the first and fourth crank pins are oppositely disposed, the second and third crank pins oppositely disposed, and an angle between the first and second crank pins is a right angle;

a cam shaft comprising intake and exhaust cams; and power transmitting means between the cam shaft and the crank shaft.

2. An engine according to claim 1, wherein the intake cam has two lobes disposed in the opposite direction to each other and the exhaust cam has two flat portions disposed in the opposite direction to each other.

3. An engine according to claim 1, wherein one expansion stroke is accomplished per one rotation of the crank shaft.

* * * * *

UNITED STATES PATENT AND TRADEMARK OFFICE
CERTIFICATE OF CORRECTION

PATENT NO.  : 5,491,977
DATED       : February 20, 1996
INVENTOR(S) : Cheol-seung Cho; Kwang-soo Han It is certified that error appears in the above-indentified patent and that said Letters Patent is hereby corrected as shown below:

```
On the Title page, [73] Assignee, change "heol-seung Cho"
        to -- Cheol-seung Cho --.
Column 1, lines 23,47, change "a" to -- an -- (both
        occurrences).
Column 2, line 23, change "the cylinder" to
        -- The cylinder --.
Column 2, line 37, change "thereby. (intake valve is
        not shown)" to -- thereby (intake valve is not
        shown). --
Column 2, line 57, change "a electro" to -- an electro --.
Column 3, line 11, change "pin" to -- pins --.
Column 3, line 23, change "6B" to -- 6D --.
Column 3, line 54, change "the compressor" to
        -- The compressor --.
Column 4, line 6, before "twelve" insert -- in --.
Column 4, line 11, change "a" (second occurrence) to
        -- an --.
```

Signed and Sealed this

Thirteenth Day of August, 1996

BRUCE LEHMAN

*Attest:*

*Attesting Officer*          *Commissioner of Patents and Trademarks*